United States Patent [19]

Nicholson

[11] Patent Number: 4,594,251

[45] Date of Patent: Jun. 10, 1986

[54] PREPARATION OF TAR-DEPLETED LIQUID SMOKE TREATED CASINGS

[75] Inventor: Myron D. Nicholson, Lemont, Ill.

[73] Assignee: Union Carbide Corporation, Danbury, Conn.

[21] Appl. No.: 595,601

[22] Filed: Apr. 4, 1984

Related U.S. Application Data

[63] Continuation-in-part of Ser. No. 483,295, Apr. 8, 1983, abandoned.

[51] Int. Cl.$^4$ ............................................. A22C 13/00
[52] U.S. Cl. ............................ 426/262; 138/118.1; 426/135; 426/650; 428/36
[58] Field of Search ............... 426/105, 135, 413, 262, 426/268, 314, 315, 650; 138/118.1; 428/36; 252/305

[56] References Cited

U.S. PATENT DOCUMENTS

| | | | |
|---|---|---|---|
| 1,015,519 | 1/1912 | Strobach | 201/30 |
| 1,697,738 | 1/1929 | Suida | 562/608 |
| 3,106,473 | 10/1963 | Hollenbeck | 138/118.1 |
| 3,873,741 | 3/1975 | Melcer et al. | 426/314 X |
| 4,359,481 | 11/1982 | Smits et al. | 426/650 X |
| 4,431,033 | 2/1984 | Nicholson | 426/105 X |
| 4,505,939 | 3/1985 | Chiv | 426/135 |
| 4,540,613 | 9/1985 | Nicholson et al. | 426/105 X |

*Primary Examiner*—Arthur L. Corbin
*Attorney, Agent, or Firm*—James L. Sonntag

[57] ABSTRACT

Tar-depleted liquid smoke solutions are made by generating a smoke vapor, selectively solvent extracting the tars from the smoke vapor, and absorbing the color, flavor and odor constituents of the smoke vapors into an aqueous medium. The aqueous tar-depleted liquid smoke has a high coloring ability, a high concentration of carbonyls, and a low phenol content and is used to treat a tubular casing.

19 Claims, 6 Drawing Figures

PREPARATION OF TAR-DEPLETED LIQUID SMOKE TREATED CASINGS

This application is a continuation-in-part of application Ser. No. 483,295, filed Apr. 8, 1983, now abandoned.

FIELD OF THE INVENTION

This invention relates to: (a) a method for preparing tar-depleted liquid smoke solutions from smoke vapors, (b) tar-depleted liquid smoke compositions, (c) tar-depleted, partially neutralized liquid smoke compositions, (d) food casings colored and flavored with tar-depleted liquid smoke compositions, (e) a method for making food casings colored and flavored with tar-depleted liquid smoke compositions, and (f) a method for preparing a smoke colored and flavored foodstuff encased in a casing.

BACKGROUND OF THE INVENTION

Tubular cellulosic food casings are used extensively for processing a great variety of meat products and other food items. The food casings are generally thin-walled tubing of various diameters prepared from reconstituted materials, such as regenerated cellulose. Cellulosic food casings may also be prepared with fibrous webs embedded in the wall thereof, such casings commonly being referred to as "fibrous food casings."

The many different recipes and modes of processing that are used by the processed food industry to suit different tastes, and even regional preferences, generally necessitate the use of food casings with a variety of characteristics. In some instances, for example, food casings are required to have multifunctional uses wherein they serve as containers during the processing of a food product encased therein, and then also serve as a protective wrapping for the finished product. In the processed meat industry, however, the food casings used in the preparation of many types of meat products, such as various types of sausages, such as frankfurters, bolognas and the like, beef rolls, hams and the like, are frequently removed from about the processed meat product prior to slicing and/or final packaging.

Surface appearance and flavor are important factors in the commercial and consumer acceptance of processed meat products, and a common feature of most varieties of such products involves the use of "smoking" for imparting characteristic flavor and color thereto. The "smoking" of food products is generally accomplished by the food processor subjecting the food product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of liquid aqueous solutions of wood-derived smoke constituents, commonly called "liquid smoke solutions" that have been developed and used commercially in the food processing industry for the processing of many types of meat and other food products. For convenience in this specification, these commercially available "liquid smoke" solutions in their as-purchased state will be frequently referred to herein as "as-is" liquid smoke.

Examples of processes for preparing as-is liquid smoke are described in U.S. Pat. No. 3,106,473, issued Oct. 8, 1963 to Hollenbeck, and U.S. Pat. No. 3,873,741, issued Mar. 25, 1975 to Melcer et al. The processes for making liquid smoke can be generally described as comprising: (1) heating wood in an oxygen-controlled atmosphere to effect the thermal decomposition of wood and to generate smoke, and (2) contacting the smoke with an aqueous solution to condense and to recover the coloring and flavoring constituents of the smoke. The condensed as-is liquid smoke solutions generally also contain various tarry-substances, as well as organic acids such as acetic acid.

The application of "liquid smoke solutions" to meat products is generally carried out in a variety of ways, including spraying or dipping an encased food product during the processing thereof, or by incorporating the "liquid smoke solution" in the recipe itself. The actual operation of "smoking" by spraying or dipping is not completely satisfactory due to inability to treat the encased product uniformly, and incorporation of "liquid smoke solution" in the meat recipe does not always provide the desired surface appearance because of dilution of smoke ingredients. Incorporation in the recipe also reduces the stability of the meat emulsion, and will adversely affect taste if high concentrations are used. Application of liquid smoke to encased food products by the food processor, such as by spraying or dipping, also causes unwanted pollution and equipment corrosion problems for the food processor. In addition, encased sausages treated by application of the liquid smoke during commercial processing have been found to yield, after peeling the casing from the treated encased food product, sausages which are lacking in smoke color uniformity between individual sausages and batches of sausages. Even more undesirable is the lack of uniformity of coloration which often appears on the surface of the individual sausage, including light and dark streaks, light and dark blotches, and even uncolored spots which especially appear at the ends of sausages.

Several methods are known for coating either the interior or the exterior of a food casing with various liquid substances designed to meet particular processing requirements, as, for example, substances that affect the adhesion properties of the casing. Some of the coatings known in the art contain a liquid smoke as a constituent thereof.

Known methods for coating an as-is type liquid smoke solution internally in a casing have been found to be costly and also to limit the speed of a continuous high speed production line.

Known methods for coating the external surface of a casing, particularly a cellulosic gel-stock casing, with as-is type liquid smoke solutions, result in problems due to the tar content of these smoke solutions. That is, during the coating process, tarry deposits accumulate on the carrier rolls and the squeeze rolls of the treatment unit, which eventually forces shutdown of the treatment system.

One solution to the above-mentioned problems of imparting smoke color and flavor to a foodstuff is to use "tar-depleted" liquid smoke solutions to coat the interior or preferably the exterior surface of the casing. However, until recently, tar-depleted liquid smoke solutions were unavailable, and methods for making the same were unknown. As indicated above, it has been found that when a cellulosic food casing, made from a fibrous or non-fibrous gel stock, is treated with a highly acidic (pH of about 2.0 to 2.5) tar-containing, aqueous liquid smoke, tarry deposits accumulate on the carrier rolls and the squeeze rolls of the smoke treatment unit, causing the casing to stick to the rolls and eventually forcing shutdown of the unit. The acidity of the liquid smoke also may interfere with peelability of the casing by interfering with the action of the peeling aid used, such as, for example, carboxymethyl cellulose. Aqueous liquid smoke solutions are generally very acid, having a pH of 2.5 or less and a titratable acidity of at least 3 weight percent.

It was found that tar could be removed from the liquid smoke by neutralizing the as-is liquid smoke under controlled temperature conditions to precipitate the tar, and the use of this neutralized, tar-depleted liquid smoke to treat a gel stock casing would eliminate the problem of tarry deposits. This process is disclosed and claimed in U.S. patent application Ser. No. 417,172, filed Sept. 14, 1982 by M. D. Nicholson, now U.S. Pat. No. 4,431,032.

Contrary to the previous belief in the art, the tar-depleted liquid smoke still possesses significant smoke coloring capability. It has been generally believed that the tars in a liquid smoke mainly contribute to the coloring ability of the liquid smoke. However, it has recently been found that this is not the case, but that other constituents of the liquid smoke, believed to be mainly the carbonyls, have a more significant role in the coloring ability of the liquid smoke.

Another method, using a "solvent extraction" process may be employed to make tar-depleted liquid smoke. For example, such a process is disclosed and claimed in U.S. patent application Ser. No. 417,173, filed Sept. 14, 1982 by M. D. Nicholson, now U.S. Pat. No. 4,431,033. This process comprises (a) contacting a tar-containing aqueous smoke solution having an absorptive power of at least about 0.25 at a wave length of about 340 nm, with either a nonreactive or reactive organic liquid solvent which has a hydrogen bonding solubility parameter of at least about 2.7, and which is immiscible in the aqueous liquid smoke solution under conditions sufficient to form a tar-enriched solvent fraction and a tar-depleted liquid smoke fraction, and (b) separating the liquid smoke fraction to form a tar-depleted liquid smoke. Using such a solvent extraction method, it is possible to make tar-depleted liquid smoke solutions having a high capability to impart smoke color, odor, and flavor, without requiring neutralization of the tar-containing liquid smoke.

The tar-depleted liquid smoke made from the solvent extraction process, unless it is neutralized, is generally highly acidic, which may also interfere with the action of the peelability agents, such as certain water soluble cellulose ethers, which may be used on the casing. To alleviate this problem, the tar-depleted liquid smoke may be partially neutralized. However, since the coloration ability of the liquid smoke declines with increasing pH, the tar-depleted liquid smoke is only "partially neutralized" to a degree such that the peelability agent is not significantly affected and the coloration ability of the smoke is retained. The term "partially neutralized", as used herein, is intended to refer to liquid smoke compositions having a pH greater than about 3, preferably having a pH within the range of from about 3 to about 6.5, and even more preferably having a pH within the range of from about 3 to 5. By providing a partially neutralized, tar-depleted liquid smoke made from a solvent extraction process, the problems due to acidity are avoided to a large extent while a significant degree of the coloring ability of the original as-is liquid smoke is retained.

The above described liquid smoke compositions, whether as-is or tar-depleted, have been found suitable for use with fibrous cellulosic food casings. When used with nonfibrous casings, however, it has been found that these liquid smoke solutions, in their unconcentrated, as-manufactured form, impart a smoke color, odor and flavor to the foodstuff, but not in a quantity sufficient to be acceptable for all commercial applications. Because nonfibrous casings are thinner than fibrous casings, the liquid smoke cannot be in a practical manner "coated" on, applied to, or incorporated in the casing to an extent sufficient to always impart the desired smoke color, odor and flavor to a foodstuff. These compositions, therefore, cannot be universally used, being restricted mainly for use with fibrous casings.

In order to provide liquid smoke solutions having coloring ability sufficiently high to be usable on nonfibrous casings, tar-depleted liquid smoke solutions have been concentrated to form tar-depleted concentrated liquid smoke solutions, for example, as disclosed in U.S. patent application, Ser. No. 465,924, filed on Feb. 14, 1983 by M. D. Nicholson and J. H. Beckman, now U.S. Pat. No. 4,540,613. The tar-depleted, concentrated liquid smoke solutions have a higher coloring ability. Therefore, it is possible when using casings coated with tar-depleted, concentrated, liquid smoke solutions, to have sufficient coloring ability to color lighter foodstuffs, even when using a nonfibrous casing.

Tar-depleted, concentrated liquid smoke solutions can be made by a process which comprises providing an unneutralized, tar-depleted liquid smoke composition made from a solvent extraction process, and concentrating the unneutralized tar-depleted liquid smoke. The concentrated, tar-depleted liquid smoke product has surprising and advantageous physical properties, and it may be optionally neutralized to provide a partially neutralized, concentrated, tar-depleted liquid smoke composition.

The tar-depleted, concentrated liquid smoke solutions, described above, avoid the difficulties inherent when an as-is smoke is concentrated, wherein there is an increased concentration of undesirable chemical substances, for example tars, and certain other constituents which are desirable, for example phenols, which contribute to the flavoring ability, but cause an undesirably "strong" or "creosotic" flavor in high concentrations.

One problem in concentrating liquid smoke solutions is that when a neutralized liquid smoke is concentrated to a suitably high degree for coating on nonfibrous casings, there is a significant and undesirable increase in viscosity, rendering the resulting concentrated, liquid smoke unsuitable for commercial use. The increase in viscosity of neutralized, as-is and tar-depleted liquid smoke solutions which are concentrated is in large part due to the presence of acids, mostly acetic acid, in the liquid smoke. Upon neutralization of the acids in the liquid smoke, salts of neutralization of these acids are formed, and it is these salts that are the substances which mainly contribute to the high viscosity. In nonconcentrated smoke solutions which are neutralized, the concentration of these salts is generally not high enough to cause a difficulty. However, when a neutralized smoke is concentrated, the concentration of these salts increases proportionally with the degree of concentration, resulting in an excessive concentration of these salts and, thus, an undesirably high viscosity.

It has now been found by Nicholson and Beckman as disclosed in the above-cited U.S. application Ser. No. 465,924, that when concentrating an unneutralized, tar-depleted, liquid smoke, the acid content is not proportionally increased with the degree of concentration of the liquid smoke. That is, as the unneutralized, tar-depleted smoke is concentrated, the acids causing the viscosity difficulties are apparently volatilized to a significant degree. Thus, it is possible to make concentrated liquid smoke solutions, while retaining a suitably low viscosity. The tar-depleted concentrated liquid smoke compositions of the above cited Ser. No. 465,924, because of their low total acid content, have a low viscosity when neutralized. Additionally, they are also tar-depleted, and thereby provide the processing advantages heretofore found only with the use of unconcentrated, tar-depleted liquid smoke solutions. They also have substantially increased smoke coloring and flavoring abilities over unconcentrated, tar-depleted liquid smoke solutions.

There is also an increase in the viscosity of concentrated as-is smoke solutions, which may be due in part to the presence of the high molecular weight polymeric tar constituents in the liquid smoke composition. The low amount of tars in the tar-depleted concentrated liquid smoke compositions also contribute to the low viscosity of both the unneutralized and partially neutralized forms.

The tar-depleted concentrated liquid smoke solutions have many advantages. However, heretofore they required additional processing of as-is liquid smoke. The extra processing includes the treatment to tar-deplete the as-is smoke and the processing to concentrate the resulting tar-depleted liquid smoke, when a concentrated liquid smoke is desired. This extra processing of the as-is liquid smoke to prepare the concentrated and unconcentrated, tar-depleted liquid smoke solutions requires expensive processing equipment and extra labor costs. It would be an advantage, therefore, to produce tar-depleted liquid smoke solutions, having the coloring ability of either concentrated or unconcentrated liquid smoke solutions, without extra process steps beyond the condensation of the smoke vapors to form a liquid smoke solution.

In U.S. Pat. No. 4,359,481, issued Nov. 16, 1982 to Smits et al., is disclosed a process for making a liquid smoke having reduced tar-content by fractional condensation, i.e. by cooling the smoke vapors in various stages. The liquid smoke product of the Smits et al. is produced for its flavoring ability, and is not shown to have a high coloring ability.

An object of the invention is, therefore to produce tar-depleted liquid smoke solutions without the extra processing of as-is liquid smoke.

Another object is to provide a method for preparing tar-depleted liquid smoke solutions, characterized by fewer process steps and less expensive equipment than heretofore possible.

Another object of the invention is to provide a method to produce, from the condensation of smoke-vapors, tar-depleted liquid smoke solutions having degrees of coloring ability, equivalent to unconcentrated liquid smoke solutions.

Another object of the invention is to provide a method to produce, from the condensation of smoke-vapors, tar-depleted liquid smoke solutions having degrees of coloring ability, equivalent to concentrated liquid smoke solutions.

Another object of the invention is to produce tar-depleted liquid smoke solutions having a high content of carbonyls.

Another object of the invention is to produce tar-depleted liquid smoke solutions having a high coloring ability.

Another object of the invention is to produce a concentrated tar-depleted liquid smoke with high coloring ability and low viscosity.

Other objects will become apparent in the description that follows.

SUMMARY OF THE INVENTION

An aspect of the present invention is a method for preparing a tar-depleted liquid smoke solution which comprises (1) thermally decomposing wood in an oxygen-controlled atmosphere to generate smoke vapors, (2) selectively solvent extracting the tars from the generated smoke vapors, and (3) absorbing the smoke vapors into an aqueous medium to provide a tar-depleted liquid smoke solution.

Another aspect of the present invention is a method for preparing a tar-depleted liquid smoke solution which comprises (1) thermally decomposing wood in an oxygen-controlled atmosphere to generate smoke vapors, (2) contacting the smoke vapors, water and an organic solvent having solubility parameter greater than about 2.7, to form a tar-containing liquid solvent phase and an aqueous liquid smoke phase, (3) separatig the liquid smoke phase from the the liquid solvent phase to provide a tar-depleted liquid smoke solution.

Another aspect of the present invention is an improvement in a method for preparing a tar-depleted liquid smoke solution which comprises thermally decomposing wood in an oxygen-controlled atmosphere to generate smoke vapors and condensing the smoke vapors into an aqueous medium, the improvement of selectively removing the tars from the smoke vapor, by a process which comprises contacting the smoke vapors with an organic solvent having a solubility parameter greater than about 2.7.

Another aspect of the present invention is any of the above methods wherein the smoke vapors are contacted with water and a solvent in a single contactng zone.

Another aspect of the present invention is any of the above methods wherein the smoke vapors are contacted with a solvent in a first contacting zone and thereafter contacted with water in a second contacting zone.

Another aspect of this invention includes a process for preparing a tar-depleted, partially neutralized liquid smoke solution which comprises preparing a tar-depleted liquid smoke by any of the above defined methods and thereafter partially neutralizing the tar-depleted liquid smoke to a pH greater than about 3, preferably to a pH between about 3 and about 6.5, and most preferably to a pH between about 3 and about 5.

Another aspect of this invention includes either an unneutralized or a partially neutralized tar-depleted liquid smoke composition made from any of the above processes.

Another aspect of this invention includes a tar-depleted smoke colored and smoke flavored tubular food casing which is made by contacting a tubular casing wall with any of the above described liquid smoke solutions.

Another aspect of this invention includes a method for making a tar-depleted smoke colored and smoke flavored tubular food casing by applying any of the above described liquid smoke solutions to a tubular casing.

Another aspect of this invention includes a method for preparing a smoke colored and smoke flavored foodstuff which comprises stuffing the above defined tubular casing with a foodstuff and processing the resulting encased foodstuff under conditions sufficient to transfer smoke color and smoke flavor constituents to the encased foodstuff.

DESCRIPTION OF THE INVENTION

As used in this specification and the appended claims, the following terms are defined as follows:

"Solution" is meant to encompass homogeneous true solutions, as well as emulsions, colloidal suspensions, and the like.

"Smoke color, odor, and flavor constituents", refers to the smoke color, odor and flavor constituents present in natural liquid smoke solutions manufactured by the condensation of smoke vapors generated by the partial combustion of hardwoods. Examples include liquid smoke solutions in their as-is or present commercially available form.

"Absorptive power" is a measure of the coloring capability of the liquid smoke solution. Absorptive power is measured by placing 10 mg of a liquid smoke solution to be tested (either tar-containing liquid smoke or tar-depleted liquid smoke) in a disposable vial, and 5 milliliters of methanol is added thereto. The two components are mixed by inverting the vial, and the ultraviolet absorption value of the mixture is then measured at a wavelength of 340 nm. It should be noted that whereas tar-content is a significant contributor to the absorptive power measurement, tar only contributes to the staining of food in a minor way, if at all. Thus, in commercially available as-is smoke solutions, absorptive power includes a measurement of tar-content and the coloring constituents such as carbonyls, phenols and acids. This means that absorptive power of as-is smoke solutions and tar-depleted smoke solutions may be used to rank them by smoke coloring ability. However, absorptive power of as-is liquid smoke cannot be numerically compared with the absorptive power of tar-depleted smoke solutions used in this invention because of the absorptive effect of tars.

"Absorptive index" is a measure of the coloring ability of a casing treated with the liquid smoke solution of the invention. It is measured by cutting out 2 square inches (12.9 square centimeters) of the casing to be tested and placing the cut-out portion in 10 milliliters of methanol. After about 1 hour of soaking time, the methanol has extracted all of the smoke components out of the casing, and the ultraviolet absorption value of the resulting smoke component-containing methanol is determined at a wave length of 340 nm.

"Total acid content" refers to the concentration of acids, principally acetic acid, that are present in the liquid smoke. Total acid content is measured by the following procedure:
1. Weight accurately 1 milliliter of liquid smoke (filtered if necessary) in a 250 milliliter beaker,
2. Dilute with 100 milliliters of distilled water and titrate with standard 0.1N NaOH to a pH of 8.15 (as measured on a pH meter),
3. Calculate the total acid content as weight percent of acetic acid (HAc), using the following conversion:

$$1 \text{ ml } 0.1000\text{N NaOH} = 6.0 \text{ mg HAc}$$

This method can be used to measure total acid content of tar-containing liquid smoke solutions and tar-depleted liquid smoke solutions that have not been neutralized.

"Light transmittance" is measured for mixtures of liquid smoke solutions and water. This measured light transmittance (relative to pure water) is inversely related to tar-content of the tested liquid smoke, i.e. a high tar-content results in a cloudy liquid with low light transmittance. The procedure for measuring light transmittance is to thoroughly mix a 1 milliliter aliquot of the liquid smoke with 10 milliliters of water, and determine its turbidity-transmittance on a spectrophotometer using a light wavelength of 590 nm. The higher the percent transmittance reading, the lower the residual tar concentration in the liquid smoke composition.

"Smoke Vapor" refers to the principally gaseous product of the limited combustion of woods. It comprises a complex mixture of wood combustion products and varies according to the wood used and the burning conditions. While the smoke vapor is principally gaseous, it also comprises a colloidal suspension of various liquid and solid materials.

The smoke vapor in the process of the invention is generated by the incomplete combustion of wood by limiting or controlling the amount of atmospheric oxygen available for combustion. The smoke vapor may be produced by any suitable method known in the art. Suitable methods include the use of externally heated retorts provided with openings for the controlled introduction of air, packing house type smoke generators, and indirect-heat calciners, which are essentially cylindrical retorts rotating within a cylindrical furnace. Suitable methods of generation of smoke vapor are disclosed in the above-cited U.S. Pat. No. 3,106,473 and U.S. Pat. No. 3,873,741.

By practice of the invention, the tars, which are mainly polycyclic aromatic hydrocarbons, are selectively removed from the generated smoke vapors by a method that selectively removes the tars from the vapor using a solvent that does not remove the smoke color and flavor constituents. Suitable methods for extracting the tars from the smoke vapor include methods of contacting a gas and a liquid, wherein the tars are removed through gas-liquid absorption, and/or liquid-liquid extraction.

The solvent extraction of the tars from the smoke vapor may be achieved by contacting the smoke vapor with an absorptive liquid, under conditions wherein the tars are selectively removed from the smoke vapor and absorbed into the absorptive liquid. This can be accomplished by using known methods and apparatus used to contact a liquid with a gas phase. Suitable apparatus include plate columns, having crossflow plates, such as sieve plates, bubble-cap and valve plates, and counter flow plates such as dual-flow plates, turbogrid trays and ripple trays. Also suitable are packed columns having any of the known packings, such as for example raschig rings, lessing rings, berl saddles, intralox saddles, tellerettes, and pall rings. Liquid dispersed contactors such as spray columns, baffle-plate or shower deck columns, and gas-in-liquid dispersed contactors such as bubblers, spargers, high speed agitators, rotary disc columns, aerators, and the like, are also suitable. A general description of various methods suitable for use in the invention for contacting a gas with a liquid is found in Chemical Engineers Handbook, Perry & Chilton, Fifth Edition, pages 18-3 to 18-93.

The organic liquid solvent used in the invention should be immiscible in water and have a hydrogen bonding solubility parameter in the environment of the liquid-gas contacting zone of least about 2.7. The organic liquid solvent may be either nonreactive with the smoke vapor or reactive with the smoke vapor to form a derivative organic liquid solvent. If reactive, the derivative solvent should also have the same solvent properties as described above.

The hydrogen bonding solubility parameter, as used herein, can be calculated from known literature or experimental vapor pressure data such as the heat of vaporization at 25° C. The total solubility parameter ($\delta_T$) may be determined by using the relation of Equation (1):

$$\delta_T = \left[ \frac{(\Delta H_{25} - RT)d}{M} \right]^{\frac{1}{2}} \quad (1)$$

where:
$\Delta H_{25}$ = Heat of vaporization at 25° C.,
R = Gas constant,
T = Temperature in degrees absolute,
d = Density at 25° C., and
M = Molecular weight.

The total solubility parameter value can be separated into its hydrogen bonding ($\delta_H$), or polar ($\delta_p$), and nonpolar ($\delta_{HP}$) constituents. The following relationships are useful for determining the hydrogen bonding parameter value ($\delta_H$):

$$\log \alpha = 3.39066 \frac{T_b}{T_c} - 0.15848 - \log \frac{M}{d} \quad (2)$$

$$\delta_H = \delta_T \sqrt{\frac{\alpha - 1}{2}} \quad (3)$$

where:
$\alpha$ = Aggregation number,
$T_b$ = Boiling point in degrees absolute,
$T_c$ = Critical temperature in degrees absolute.

The theoretical basis for use of solubility characteristics is discussed in the literature. Tabulations of parameters have been published in "The Three Dimensional Solubility Parameter and Solvent Diffusion Coefficient," Danish Technical Press, 1967, Copenhagen, by C. M. Hansen. A list of solubility parameters can be obtained from K. L. Hoy, "Tables of Solubility Parameters", Union Carbide Corporation, 1975, obtainable from Union Carbide Corporation, River Road, Bound Brook, N.J. 08805.

Suitable organic solvents include halogen di- or trisubstituted methanes, such as methylene dichloride, bromochloromethane, and the like; chloroform, bromoform, and the like; acetophenone; and alcohol liquids such as 2-ethylhexanol, the phenyl ether of ethylene glycol, and monohexyl ether of ethylene glycol, n-octyl alcohol, n-hexyl alcohol, and n-butyl alcohol. The preferred solvent is methylene dichloride (dichloromethane).

The resulting tar-depleted smoke vapors containing smoke flavor, odor, and color constituents can be recovered, by known methods, into an aqueous medium to form an aqueous, tar-depleted smoke solution. These include those described in the above-cited U.S. Pat. No. 3,106,473 and U.S. Pat. No. 3,873,741. Also included is the use of the gas-liquid contacting equipment listed above.

In a preferred practice of the invention, the smoke vapor is contacted with water and a solvent in a single contacting means, that is the color, flavor, and odor constituents are recovered in an aqueous medium in the same contacting means as that used for the contacting of the smoke vapor with the solvent to extract the tar components. This is accomplished by simultaneously introducing water and the organic solvent into the gas-liquid absorption means. The resulting products of the process are a waste gas stream, containing some acetic acid that was in the generated smoke vapor and a two phase liquid product. In the two phase liquid product, the aqueous phase contains the the smoke flavor, color and odor constituents, and is the tar-depleted liquid smoke of this invention. The organic solvent phase contains the tars that were in the generated smoke vapor. While a single contacting means is preferred, separate vessels could be used for contacting the solvent and the water with the smoke vapor.

Figure 1:
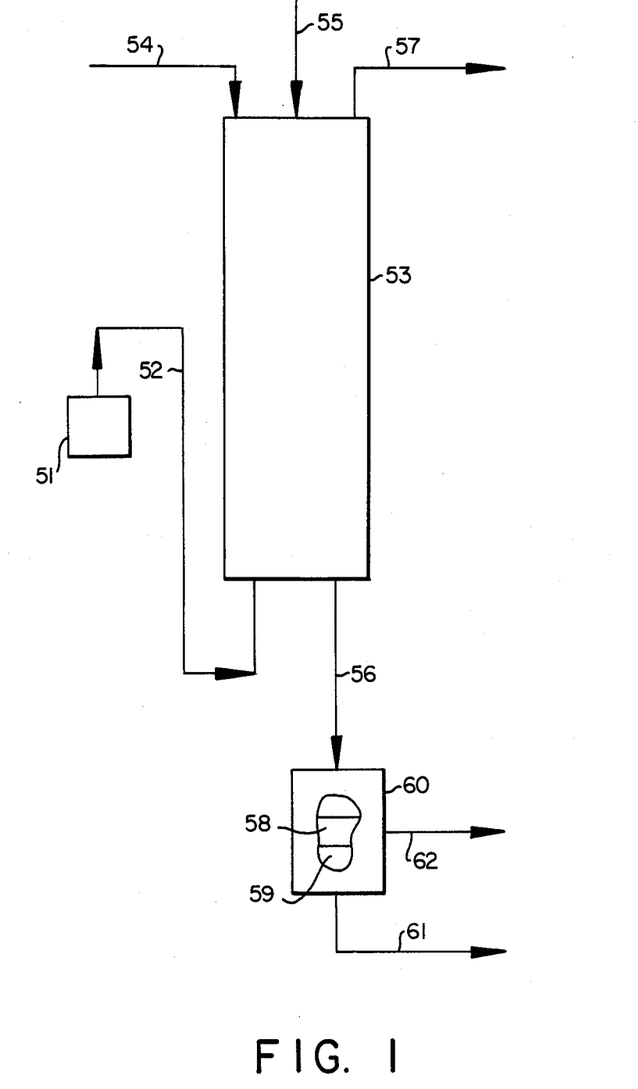
FIG. 1 is a flow diagram of a continuous process for making a tar-depleted liquid smoke according to the invention.
Figure 2:
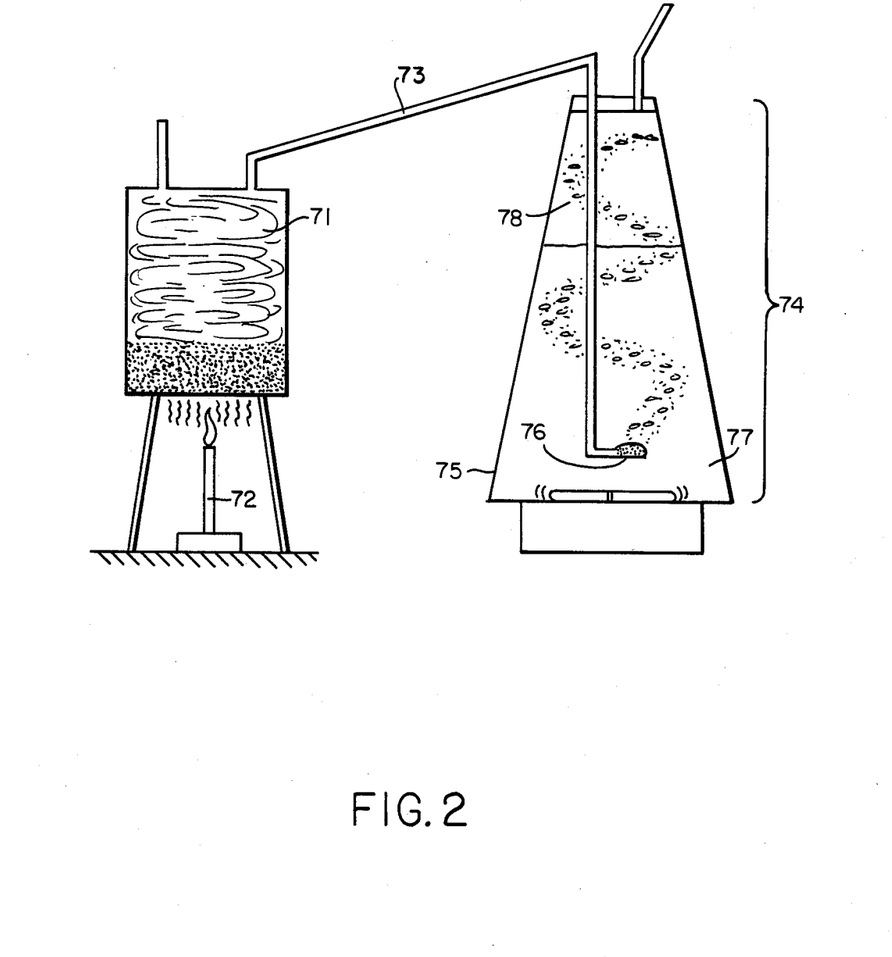
FIG. 2 is a schematic view of a laboratory apparatus for making a tar-depleted liquid smoke according to the invention.

The conditions of the gas-liquid contacting are such that color, flavor and odor constituents are transferred to the aqueous phase to form a liquid smoke solution having sufficient coloring and flavoring ability. In a continuous process, as illustrated by FIG. 1, the flow rates of the smoke, water and solvent are regulated so that the concentration of the smoke color, odor, and flavor constituents in the aqueous liquid smoke phase is high enough to provide the desired coloring and flavoring ability. In a batch process, such as illustrated by FIG. 2 and Example 1, the process is continued until the concentration of the color, odor and flavor constituents is high enough to provide the desired flavoring and coloring ability. In calculating the amount of water introduced it should be considered that water is also introduced as a gas in the smoke vapor. During the absorption process this water will condense. Although it is preferred to introduce additional water separately, it is possible, due to this water in the smoke vapor, to make a tar-depleted liquid smoke of the invention with minimal addition of water, relying on the water condensed from the smoke vapor to form the bulk of the aqueous phase to absorb the color, flavor and odor constituents.

By so regulating the conditions, as described above, it is possible to make a tar-depleted liquid smoke having the desired concentration of color, flavor, and odor constituents. Previously, tar-depleted liquid smoke solutions were made from the commercially available as-is liquid smoke solutions, which have only limited concentrations of color, flavor and odor constituents. None of these commercially available as-is liquid smoke solutions have concentrations high enough to coat a casing in one application, such that the casing will sufficiently color and flavor certain food products, such as light colored meats. Commercial liquid smoke solutions have limited concentrations due to problems involving undesirably high concentrations of tars and phenols when as-is smokes are made in a concentrated form. Since tar-depleted liquid smoke solutions have been made from the low concentration, as-is liquid smoke solutions, such solutions also have inadequate flavoring and coloring ability for some applications, and it is necessary to subject these tar-depleted liquid smoke solutions to a further concentration process to obtain the desired coloring and flavoring ability. By practice of the invention, it is possible to obtain tar-depleted liquid smoke solutions having coloring and flavoring ability equivalent to either concentrated or nonconcentrated as-is derived liquid smoke solutions without further processing.

The aqueous tar-depleted liquid smoke phase, and the tar-containing organic solvent phase, are separated by known methods. These methods include gravity decanting, liquid cycloning, and centrifugal decanting, as well as the use of various types of separation systems used in solvent extraction methods.

A preferred method of the invention for making tar-depleted liquid smoke solutions is illustrated by FIG. 1. In FIG. 1, smoke vapors are generated in a suitable smoke generator 51. The generated smoke vapor is conveyed along line 52 to a counter-current gas-liquid absorption column 53, such as, for example a packed column, plate column or a spray column. An organic solvent and water are introduced into the top of the column through lines 54 and 55, respectively. In the absorption column 53, the tars are absorbed into the organic solvent, and the color, flavor and odor constituents are absorbed into the water, to form a two phase liquid product leaving the column through line 56. The remaining unabsorbed gaseous constituents of the smoke vapor leave the column through line 57 as a waste stream. The two phase liquid product comprises an aqueous, tar-depleted liquid smoke phase 58, and a tar-containing liquid solvent phase 59, which are separated in any known separation apparatus, such as a gravity settling tank 60, into the tar-depleted liquid smoke of the invention which leaves through line 62, and the tar-containing solvent which leaves through line 61.

The tar-depleted liquid smoke of the invention may be further concentrated. The tar-depleted, liquid smoke of the invention may be concentrated preferably under vacuum conditions, at a temperature of less than about 70° C., preferably less than about 50° C. Other suitable concentration methods are disclosed in the above-cited U.S. patent application Ser. No. 465,924, including freeze drying, spray drying, or various other evaporation techniques such as vaporization by room temperature evaporation in a low humidity environment, or the use of forced-circulation evaporators, long-tube vertical evaporators, and agitated film evaporators.

The tar-depleted smoke solution made by the method of the invention is optionally partially neutralized to an extent such that the pH is greater than about 3, preferably between about 3 and about 6.5, and more preferably between about 3 and about 5. The temperature is preferably controlled during the partial neutralization such that the temperature of the liquid smoke does not rise above about 40° C., more preferably such that it does not rise above about 30° C.

The partial neutralization of the unneutralized, tar-depleted, liquid smoke of the invention may be accomplished by mixing either a highly alkaline solid with the tar-depleted liquid smoke, as for example calcium carbonate, sodium bicarbonate, potassium bicarbonate, calcium hydroxide, sodium carbonate, soda-lime, and sodium hydroxide pellets or flakes, or by mixing the liquid smoke with a high pH liquid such as aqueous sodium hydroxide solution. Although the carbonates and the bicarbonates produce violent foaming, which may cause operational difficulties, the neutralization reaction of the acids in the liquid smoke with bicarbonate is endothermic, which may eliminate the need for temperature control during the neutralization.

The rate of addition of the neutralizing material to the tar-depleted liquid smoke depends on the cooling capacity of the mixing container as well as the efficiency of the mixing means, as will be understood by those skilled in the art. The coloring ability of the tar-depleted, partially neutralized liquid smoke is not substantially affected by temperature variations during the at least partial neutralization step, as long as the temperature of the bulk liquid is maintained below about 40° C., and preferably below about 30° C.

The mixing container used for the partial neutralization should be cooled by indirect means, as for example, brine circulating through immersed coils in a closed-circuit refrigeration system. The reason for indirect rather than direct contact between the refrigerant and the tar-depleted liquid smoke is to avoid contamination of the latter.

Another possible method for at least partially neutralizing the tar-depleted liquid smoke is by contacting the latter with an ion-exchange material.

The method of the invention for making tar-depleted liquid smoke solutions has many advantages over the prior art beyond that of reduced costs. As described previously, by this invention tar-depleted liquid smoke solutions can be made to have any desired concentration of flavor, color, and odor constituents without undesirable concentrations of tars and phenols. Typically, the concentration of the color constituents corresponds to from about 1 to about 5 times the concentration of the same in a tar-depleted liquid smoke made by the above described solvent extraction process from an as-is liquid smoke having about a 12% acid content, for example Charsol C-12, available from Red Arrow Products Company, Manitowoc, Wis. An advantage of the invention is that the tar-depleted liquid smoke solutions made by the process of the invention have a high coloring ability and high carbonyl content without a correspondingly high content of phenols. Typically, the content of the phenols is less than about 10 percent preferably not greater than 2 percent, of the content of the carbonyls, with 1.5 percent being achievable. The phenols are believed to be the substances that in high concentrations contribute mainly to the strong or creosotic flavor of some concentrated liquid smoke solutions. By practice of the invention, liquid smoke solutions can be made that have the equivalent coloring ability of highly concentrated tar-depleted liquid smoke solutions derived from an as-is liquid smoke. Thus, a high coloring ability is attainable without an undesirable corresponding increase in the phenolic content. As shown by the light transmittance data in the examples that follow, nearly all of the tars were absent from the aqueous tar-depleted liquid smoke product produced by the process of the invention. It is expected that by practice of the invention, tar-depleted liquid smoke solutions having a light transmittance of at least 50 percent preferably at least 80 percent, more preferably at least 90 percent, can be produced. In addition, a portion of the acids, the principal one being acetic acid, in the generated smoke vapor remains in the waste gas stream, so that the concentration of undesirable organic acids in the tar-depleted liquid smoke product may be reduced.

The tar-depleted, liquid smoke composition of this invention, whether unneutralized or neutralized, is then applied to a food casing. The food casings that are suitable for use in the invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like, in a variety of diameters. Also suitable are tubular cellulosic casings havng a fibrous reinforcing web embedded in the wall thereof, which are commonly called "fibrous food casings", as well as cellulosic casings without the fibrous reinforcement, herein referred to as "nonfibrous" cellulosic casings.

Casings conventionally known as "dry stock casings" may be used in the practice of this invention. Such casings generally have a water content within the range of from about 5 to about 14 weight percent water for nonfibrous casings, or from about 3 to about 8 weight percent water for fibrous casings, based on the total weight of the casing including water.

Casings conventionally known as "gel stock casings" are casings which have higher moisture cotents than the aforementioned casings since they have not been previously dried. Such casings may also be used in the practice of this invention. Gel stock casings, whether fibrous or non-fibrous, are the type exhibiting the aforementioned tarring problem when treated by as-is, tar-containing liquid smoke.

The tar-depleted liquid smoke solution of the invention may be applied to the outer surface of the tubular casing by passing the casing through a bath of the liquid smoke solution. The liquid smoke is allowed to soak into the casing prior to doctoring off any excess liquid smoke by passing the casing through squeeze rolls or wipers, and the like, for an amount of time sufficient for the casing to incorporate the desired amount of smoke coloring and smoke flavoring constituents. The process of passing the casing through a treatment bath, also referred to in the art as a "dip bath" or a "dip tank," may also be referred to in the art as a "dipping" step. The liquid smoke of the invention may alternatively be externally applied to the casing by methods other than dipping, such as spraying, brushing, roll-coating, and the like.

Alternatively, the tar-depleted, liquid smoke composition of the invention may be applied to the internal surface of the casing by any of several well-known procedures such as those described in U.S. Pat. No. 4,171,381, issued Oct. 16, 1979 to Chiu. These include slugging or bubble coating, spraying, and coating while shirring. The slugging method for coating the inside of a casing involves filling a portion of the casing with the coating material, so that the slug of coating material generally resides at the bottom of a "U" shape formed by the casing being draped over two parallel rollers, and then moving the continuous indefinite length of casing so that the slug of coating material remains confined within the casing, while the casing moves past the slug and is coated on its inside wall by the coating material contained within the slug.

Figure 3:
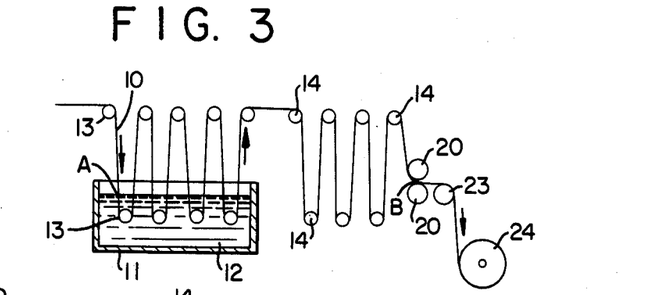
FIG. 3 is a schematic view of an apparatus suitable for treatment of the external surface of a food casing with the liquid smoke composition manufactured by the method of this invention.

One method of treating the casing with the smoke solution of the invention is shown in FIG. 3. In FIG. 3, a flattened, tubular, cellulosic sausage casing 10 is externally treated with the smoke composition of the invention during its passage over lower and upper guide rolls 13 through dip tank 11 which contains the liquid smoke solution 12 of the invention. The casing passes over lower and upper guide rolls 14 after exiting the dip tank, and then passes between squeeze rolls 20 which minimize any excess carry-over of the liquid smoke composition. The total contact time of the casing 10 with the liquid smoke solution 12 will determine the amount of smoke coloring and smoke flavoring constituents of the tar-depleted, concentrated, liquid smoke composition that the casing will incorporate. The total contact time is measured from point A to point B in FIG. 3. After the casing passes through squeeze rolls 20, it passes over guide roll 23 and is wound up on roll 24. The casing is then sent on to further conventional processing, including conventional humidification, as may be required, and conventional shirring.

Figure 4:
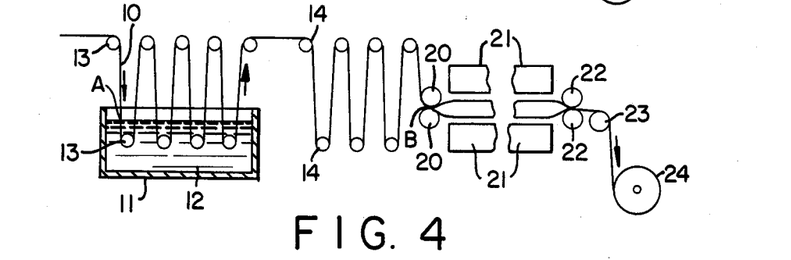
FIG. 4 is a schematic view of an apparatus similar to and performing the same functions as the apparatus of FIG. 3, but with a chamber for partially drying the casing treated with the liquid smoke composition of this invention to a desired moisture content while in an inflated condition.

The embodiment illustrated in FIG. 4 differs from the illustrated in FIG. 3 in that in FIG. 4 the casing after passing through squeeze rolls 20 is passed into a heating and drying chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device, such as circulating hot air chambers, which will dry the sausage casing to the proper moisture content. After the casing passes out of the heating chamber 21 and through squeeze rolls 22, it passes over guide roll 23 and is wound up on roll 24. The casing is then sent on to conventional further processing, including conventional humidification, as may be required, and conventional shirring.

Figure 5:
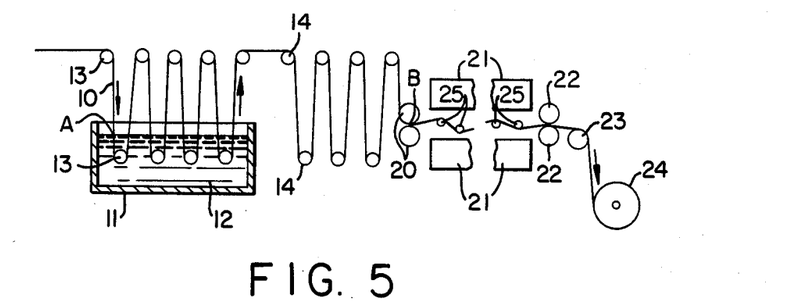
FIG. 5 is a schematic view of an apparatus similar to and performing the same function as the apparatus of FIG. 4, but with means for partially drying of the casing treated with the liquid smoke composition manufactured by the method of this invention while in a flat condition.

The embodiment illustrated in FIG. 5 differs from that illustrated in FIG. 4 in that in FIG. 5, the casing is dried in a flat condition while passing over guide rolls 25.

A preferred method for applying the tar-depleted liquid smoke solutions manufactured by the method of the invention is by a method wherein the exterior wall of a casing is coated by moving the casing through an inner opening of a first flexible and resilient means which displaces the opening edge while liquid is applied by rubbing contact. The liquid coating is then smoothed by movement through the inner opening of a rotating second flexible and resilient means. This method and apparatus incorporating this method are described in U.S. Pat. No. 4,356,218 issued on Oct. 26, 1982, to Chiu et al.

Therein the apparatus is described as an apparatus for liquid coating the exterior wall of an inflated flexible tubing during its longitudinal movement comprising; (a) first flexible and resilient means with an inner circular opening having slightly smaller diameter than the diameter of the inflated flexible tubing exterior wall, the first means being transversely positioned relative to the tubing axis and arranged such that the inflated flexible tubing may be moved in its longitudinal direction through said inner circular opening, so as to displace the circular opening edge while maintaining rubbing contact therewith; (b) means for supplying said liquid to said first means (a) for distribution thereby, so as to be applied to the longitudinally moving inflated flexible tubing exterior wall during said rubbing contact; (c) second flexible and resilient means with an inner circular opening, the second means being rotatable around the opening center and the opening having slightly smaller diameter than the diameter of the inflated flexible tubing exterior wall, said second means being transversely positioned relative to the tubing axis and adjacent to, but spaced downstream from the first means (a) with respect to the longitudinally moving tubing such that the tubing with the coating on its external wall may be moved through said inner circular opening of said second means so as to displace the rotating circular opening edge while maintaining rubbing contact therewith for smoothing the applied liquid on the tubing exterior wall as a film of uniform thickness; and (d) means for rotating said second means (c) around the tubing axis during its longitudinal movement through said second means so as to maintain said rubbing contact while smoothing said liquid into a continuous film of substantially uniform thickness on the tubing exterior wall.

The method is described as a method for coating the exterior wall of a longitudinally moving inflated flexible tubing with liquid comprising the steps of (a) continuously moving the inflated flexible tubing in the longitudinal direction along a straight line; (b) providing first flexible and resilient means with an inner circular opening of slightly smaller diameter than the diameter of the inflated tubing exterior wall; (c) supplying liquid to said inner circular opening of the first means; (d) moving said inflated tubing through said inner circular opening of said first means and maintaining rubbing contact with the opening edge so as to displace said opening edge and simultaneously apply said liquid to, and distribute the applied liquid around the inflated tubing exterior wall; (e) providing second flexible and resilient means with an inner circular opening of slightly smaller diameter than the diameter of the inflated tubing exterior wall; (f) rotating said second means around its centerline axis; and (g) moving said inflated tubing with said liquid applied on its exterior wall through the rotating second means inner circular opening and maintaining rubbing contact with the opening with the opening edge so as to displace said opening edge while simultaneously smoothing the liquid coating as a continuous film of substantially uniform thickness on the tubing exterior wall.

It is to be noted that the tar-depleted liquid smoke composition which is applied or "coated" on the casing surface, whether externally or internally, does not exist solely as a surface coating. Smoke color, odor and flavor constituents which are coated on the surface penetrate the cellulosic structure of the casing as the cellulose absorbs the smoke solution. Inspection of the cross-section of the casing wall discloses a color gradation across the casing wall, with the smoke treated surface having a darker color than the color on the surface on the opposite side of the casing wall. Accordingly, as used, herein, the term "coating" or "coated" is meant to apply to a casing wall that is not only coated with smoke constituents but also impregnated with smoke constituents.

The coated casing may be shirred by conventional methods, or prior to shirring, it may be dried and/or humidified to a water content suitable for shirring and/or further processing. The need for conventional drying and/or humidification after treatment with the liquid smoke compositions of this invention depends on the water content of the casing after treatment and the type of casing. If the casing is a nonfibrous casing, a water content within the range of from about 11 to about 13 weight percent water before shirring, and between about 14 and 18 weight percent after shirring, is typical. For fibrous casings, a water content within the range of from about 5 to about 7 weight percent water before shirring is typical, and after shirring the water content is typically in the range of from about 14 to 35 weight percent, where the percentages are based on the total weight of casing including water.

The liquid smoke compositions of the invention may also contain other ingredients which may be suitably used in treatment of a tubular food casing, to which the smoke constituents are applied, e.g., glycerine and/or propylene glycol, and the like, which may be used as humectants or softening agents.

Other ingredients which are normally used in the manufacture of, or for further treatment of the food casings, e.g. cellulose ethers and mineral oil, may also be present in the casing if desired, and they may be used in the same manner and amounts as if the liquid smoke composition of the invention had not been used.

In particular, agents for improving the peelability of the casings from food products such as sausages, e.g. frankfurters, bolognas and the like, may be optionally coated on the internal surface of the casings before or after the external application of tar-depleted, concentrated, liquid smoke composition to the casing and before or during shirring. If the tar-depleted liquid smoke is applied to the casing internal surface, the peelability agent is preferably applied first. Such peelability enhancing agents include, but are not limited to, carboxymethyl cellulose, methyl cellulose, and other water soluble cellulose ethers, the use of which is disclosed in U.S. Pat. No. 3,898,348 issued Aug. 5, 1975 to Chiu, et al.; "Aquapel", a trademarked product, made by Hercules, Inc., Wilmington, Del., comprising alkyl ketene dimers, the use of which is further disclosed in U.S. Pat. No. 3,905,397 issued Sept. 16, 1975 to Chiu; and "Quilon", a trademarked product, made by E. I. DuPont de Nemours Co., Wilmington, Del., comprising fatty acid chromyl chlorides, the use of which is further disclosed in U.S. Pat. No. 2,901,358 issued Aug. 25, 1959 to W. F. Underwood et al.

The peelability enhancing agent may be applied to the internal surface of the tubular food casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 issued Apr. 16, 1968 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827, issued June 24, 1969 to Bridgeford.

The method of this invention is also suitable for producing a printed casing, e.g., a casing having an insignia, trademark, lettering, and the like printed thereon, having smoke coloring and smoke flavoring constituents incorporated therein. Exemplary printed casings are disclosed in U.S. Pat. No. 3,316,189, issued Apr. 25, 1967 to Adams.

Casings prepared using the method of this invention are also suitable for the processing of what is conventionally known in the art as "dry sausages." Unlike other types of nonfibrous and fibrous casings which are preferably easy to peel from the food product, either by the food processor before sale to the customer or by the consumer, "dry sausage" casing preferably adheres to the food product during and after processing. "Kymene," a trademarked product, made by Hercules, Inc., which is a polyamide epichlorohydrin resin, the use of which is further disclosed in U.S. Pat. No. 3,378,379 issued Apr. 16, 1968 to Shiner et al., may optionally be coated on the internal surface of a casing treated with the smoke composition of the invention to improve the adhesion of the casing to food products processed therein.

The casings treated with the liquid smoke compositions of this invention can then be used in conventional processes for the processing of sausages and the like, and the smoke flavor and color constituents are transferred to the food stuff encased in the casing.

The aqueous tar-depleted liquid smoke solutions of the invention can be used to make a smoke flavored cereal product, which can be used as an additive to food. This is accomplished by admixing the aqueous tar-depleted liquid smoke with a cereal, such as malt, and drying the mixture. A suitable method is disclosed in U.S. Pat. No. 3,177,077, issued Jan. 7, 1983 to Hollenbeck.

The aqueous tar-depleted liquid smoke solutions of the invention can be used to make a smoke-flavored edible oil. This is made by contacting the aqueous tar-depleted liquid smoke of the invention with an edible oil and separating the oil phase from the aqueous phase to form a smoke-flavored edible oil. A suitable method is disclosed in U.S. Pat. No. 3,480,446, issued Nov. 25, 1969 to Hollenbeck.

The invention will now be more clearly understood by reference to the following examples which are set forth as being merely illustrative of the invention and which are not intended, in any manner, to be limitative thereof.

In the following examples, the phenols and carbonyl content of liquid smoke were determined by the following procedure. All the samples to be evaluated were prepared by filtering them through a Whatman No. 2 filter paper or equivalent, and refrigerating them as soon as possible after preparation to avoid possible polymerization. All samples were diluted with distilled water in two steps. In the first step 10 milliliters of the sample were diluted to a total volume of 200 milliliters, and in the second step 10 milliliters of the solution from the first step were further diluted to a total volume of 100 milliliters. For the determination of the phenols, 5 milliliters of the solution from the second step were further diluted in a third step with distilled water to a total volume of 100 milliliters. For carbonyl determination, 1 milliliter of the second solution was further diluted with carbonyl-free methanol to a total volume of 10 milliliters.

The procedure for the determination of the amount of phenols was a modified method for detecting the amount of phenols as 2,6-dimethoxyphenol based on the procedure described by I. W. Tucker in "Estimation of Phenols in Meat and Fat", JACAC, XXV. 779 (1942).

The reagents used for determination of the phenols were
1. Boric acid-potassium chloride bufer having a pH of 8.3, made by diluting to 1 liter with distilled water
   a. 125 milliliters of 0.4 Molar boric acid solution,
   b. 125 milliliters of 0.4 Molar potassium chloride solution, and
   c. 40 milliliters of 0.2 Molar sodium hydroxide solution,
2. 0.6 weight percent sodium hydroxide solution,
3. Color reagent, made by dissolving 0.25 grams of N-2,6-trichloro-benzoquinoneamine in 30 milliliters of methanol and storing in a refrigerator until used, and
4. 2,6-dimethoxyphenol (DMP) standards, made by dissolving a known amount of DMP in a known amount of distilled water to form solutions of between 1 and 7 micrograms/milliliter.

The determination of the phenols was accomplished by following the steps below in order;
1. 5 milliliters of liquid smoke sample, or 5 milliliters DMP standard, or 5 milliliters of distilled water (for use as a blank), were added to 5 milliliters of pH 8.3 buffer.
2. The pH was adjusted to 9.8 using 1 milliliter of sodium hydroxide solution.
3. Just before use, 1 milliliter of the color reagent was diluted to 15 milliliters with distilled water and 1 milliliter of the diluted color reagent was added to the test sample.
4. The color was allowed to develop for 25 minutes at room temperature.
5. The absorbance was determined at a wave length of 580 nm in a 1 cm colorimeter tube. The spectrophotometer was a Spectronic 20, available from Bausch and Lomb, Rochester, N.Y.
6. A standard curve was prepared from the data of the DMP standards with absorbance as the abscissa and concentrations of the standards as the ordinate. The equivalent concentrations of phenols as DMP in the liquid smoke samples were interpolated from this curve.
7. The amount of phenols as DMP concentration in mg/ml in the liquid smoke samples were calculated by using the equation, $$\frac{\text{ppm DMP (from std. curve)} \times \text{DF} \times 0.001}{\text{vol. liq. smoke sample (ml)}} = \text{DMP conc.}$$

where "DF" in the above equation is the sample dilution factor (400), and "0.001" is a factor to convert micrograms to milligrams. To calculate the mg of phenols as DMP in a gram of liquid smoke, divide the above result by the weight of 1 milliliter of liquid smoke.

The procedure for calculating carbonyl compounds was a modified Lappan-Clark method for determining the equivalent amount of 2-butanone based on the procedure described in their article "Colorimetric Method for Determination of Traces of Carbonyl Compounds", Anal. Chem. 23, 541-542 (1959). The reagents used were 1. Carbonyl-free methanol, prepared by adding 5 g of 2,4-dinitrophenylhydrazine (DNP) to 500 milliliters of methanol and a few drops of HCl, refluxing for three hours, and then distilling,
2. DNP solution, made by dissolving twice recrystallized DNP in carbonyl-free methanol to form a saturated solution (Solution was stored in refrigerator and prepared fresh every two weeks. It was prewarmed before use to insure saturation.),
3. KOH solution, made by dissolving 10 g KOH in 20 milliliters of distilled water and diluted to 100 milliliters with carbonyl-free methanol, and
4. 2-butanone (methyl-ethyl-ketone) (MEK) standard solutions, prepared by adding known amounts between 3.0 to 10 mg of MEK in 100 milliliters of carbonyl-free methanol (used to make standard curve).

The procedure used for determining the amount of carbonyl compounds was as follows:

1. To 25 milliliter volumetric flasks containing 1 milliliter of DNP reagent add 1 milliliter of diluted liquid smoke solution, or 1 milliliter of standard MEK solution, or 1 milliliter of methanol (for reagent blank),
2. Add 0.05 milliliter of concentrated HCl to all 25 milliliter flasks, mix contents of each, and place in a water bath at 50° C. for 30 minutes,
3. Cool to room termperature and add 5 milliliters of KOH solution to each,
4. Dilute contents of each flask to 25 milliliters with carbonyl-free methanol,
5. Using a Spectronic 20 spectrophotometer, available from Bausch and Lomb, Rochester, N.Y., and 0.5×4 inch (1.27×10.2 cm) cuvettes, calibrate the spectrophotometer by reading at a wave length of 480 nm against the methanol blank and setting the absorbance at 0.
6. Using data for MEK, plot absorbance versus MEK concentration for standard curve,
7. Interpolate concentration of MEK equivalent in diluted liquid smoke solutions from this curve,
8. Calculate the carbonyls concentration as mg MEK/100 ml liquid smoke by the following equation:

$$\frac{\text{mg MEK(from std. curve)} \times DP}{100 \text{ ml}} = \text{mg. MEK per 100 ml liq. smoke}$$

where "DF" is the sample dilution factor (200). To calculate carbonyls as mg MEK/g liquid smoke, divide the result of the above equation by the weight (in grams) of 100 milliliters of the smoke being tested.

The Color Browning Index was determined as follows:

(1) Prepare a phthalate buffer solution (pH 5.5) by diluting to 1000 milliliters with distilled water, 500 milliliters of 0.1M potassium hydrogen phthalate and 76 milliliters of 0.5M NaOH;
(2) Prepare a 2 percent glycine buffer solution by dissolving 2 grams of glycine in 100 milliliters of the pH 5.5 phthalate buffer;
(3) Add 10 milliliters of the phthalate buffer solution to a 20×150 mm test tube;
(4) Add 10 milliliters of the glycine buffer solution to another 20×150 mm test tube;
(5) Add 1.0 milliliter of distilled water and 10 milliliters of glycine to serve as a reagent blank;
(6) Cap the tubes with marbles and warm the tubes in a boiling water bath for 5 minutes;
(7) Dilute the liquid smoke solution to be tested with methanol at a ratio of 1 part liqid smoke to 50 parts methanol;
(8) To the tube containing the Glycine buffer (reaction sample) and the phthalate buffer only (unreacted control) add 1.0 milliliter of the diluted liquid smoke;
(9) Allow the color reaction to proceed at 100° C. for exactly 20 minutes, after which the tubes are removed from the boiling water bath and cooled in an ice bath for 2 minutes;
(10) Using a spectrophotometer with cuvettes 0.5 inches (12.7 mm) diameter or equivalent, determine the optical density of the reaction sample and the unreacted control at a wave length of 400 nm, by reading against the glycine-water blank set at an optical density of 0.
(11) From the optical density of the reacted sample (ODR) and the optical density of the reacted control (ODU), determine the Color Browning index (CBI) from the following formula:

$$CBI = [(ODR - ODU) + 0.14] \times DF \times 0.65,$$

where DF is the sample dilution factor (50).

The Color Browning Index is a measure of the quantity of potential color forming substances present per unit of liquid smoke.

The colorimetric values "L" and "a" for sausage surfaces were obtained using a Gardner XL-23 Tristimulus Colorimeter, with a 1 centimeter aperture standardized with a white plate, all in accordance with the standard operating procedures described in the instruction manual for the Gardner XL-23 Tristimulus Colorimeter, which is commonly used in the industry for the measurement of color. Five frankfurters from each liquid smoke treated sample were tested. Measurements were made about 2.5 centimeters from each end of the frankfurters and in the middle. The 15 values obtained for the "L" and "a" values were averaged together to obtain the final figure. The "L" values represent lightness and darkness, the higher the "L" value the lighter the color. The "a" values represent redness, the higher the "a" value the redder the color.

EXAMPLE I

This example demonstrates the process of the invention using a batch process. The apparatus used is illustrated in FIG. 2. Hardwood sawdust available from Frantz Company Hardwood Sawdust, Milwaukee, Wis., was thermally decomposed to generate smoke vapor by placing 775 grams of sawdust in a smoke generator 71 comprising a 6 liter metal container capable of being sealed and heated. The metal container was heated over a bunsen burner 72, and the generated smoke vapors were led from the generator via stainless steel tubing 73 to an absorption vessel 74. The absorption vessel 74 comprised a one liter Erlenmeyer flask 75. The smoke vapor entered the absorption vessel 74 through a sintered glass sparger 76. The absorption vessel 74 was filled with 600 ml methylene dichloride (dichloromethane) and 100 ml water, and was stirred throughout the absorption to increase the gas-liquid contact. The smoke generation was continued as long as the smoke generator 71 was capable of generating smoke (about six hours). As the smoke vapors were generated, the pressure forced them into the absorption vessel 74. The organic solvent, methylene dichloride phase 77 in the absorption vessel 74 absorbed the tarry hydrocarbon components, becoming darker in color as the absorption process proceeded. The aqueous phase 78 absorbed the color, flavor, and odor constituents of the vapor. The absorption vessel was equipped with a glass water cooled condenser (not shown) to recondense evaporated water and methylene dichloride vapors. During the absorption process, the temperature of the organic phase 77 was at about 40° C., and aqueous phase 78 was also at about 40° C. The exit gas from the absorption vessel was found to have no odor and was colorless. This procedure was repeated on two subsequent days with a fresh charge of sawdust on each day, but the original charge of methylene dichloride and water was retained in flask 75 during all three days. The aqueous phase 78 was separated from the methylene dichloride phase 77 by decantation to give a measured 200 milliliters of aqueous tar-depleted liquid smoke.

A sample of the tar-depleted liquid smoke was made and analyzed. The results of the analysis are summarized in Table A. Also shown in Table A are the typical values of an as-is liquid smoke (Charsol C-12) for comparison.

TABLE A

|  | Invention | As-Is |
|---|---|---|
| CBI | 11.0 | 10.5–12 |
| Light Transmittance (%) | 100 | 0 |
| Phenols (mg/g) | 1 | 13–20 |
| Acids (%) | 11.3 | 11.5–12.5 |

The visual color of the tar-depleted liquid smoke was a very light amber color. The light transmittance was 100 percent, indicating a total depletion of tar constituents. The coloring ability as shown by the CBI is comparable to an as-is liquid smoke and the content of the phenols is significantly less.

This example demonstrates that the method of this invention may be used to prepare a tar-depleted liquid smoke solution having coloring ability comparable to commercially available as-is liquid smoke solutions. It also demonstrates the low phenol content and the low tar-content, as shown by the light transmittance, of the liquid smoke solutions of the invention as compared wth as-is liquid smoke solutions.

EXAMPLE II

The tar-depleted liqid smoke of Example I was applied to a casing and the casing was used to make a sausage product. The tar-depleted liquid smoke was partially neutralized at a temperature of about 18° C. to a pH of about 5 and was applied to a nonfibrous gel stock casing using the method and apparatus described in the above-cited U.S. Pat. No. 4,356,218. The casing was dried, shirred and then stuffed and processed by conventional steps of cooking, cold water showering, and chilling, but without the conventional step of smoke treatment. In Table B is shown the meat formulation used.

TABLE B

| Ingredients | Weight (kg) |
|---|---|
| Beef Chuck | 22.7 |
| Regular Pork Trim | 22.7 |
| Water/Ice | 9.1 |
| Salt | 1.1 |
| Spice | 0.5 |
| Prague Powder (Sodium Nitrite) | 0.13 |

The processing conditions were sufficient to cause the transfer of smoke color, odor and flavor constituents from the casing to the encased sausage. The sausages were peeled by conventional methods and colorimetric values were obtained. These are summarized below in Table C. Also shown in Table C are values obtained from sausages treated with an as-is liquid smoke (Charsol C-12), a tar-depleted liquid smoke made from an as-is liquid smoke (Charsol C-12) using the solvent extraction process disclosed in the above-cited U.S. Ser. No. 417,713 (Sol. Ext.), and an unsmoked control, using an untreated casing. The the liquid smoke solution produced by the solvent extraction process was partially neutralized to a pH of about 4 at a temperature less than about 40° C.

TABLE C

|  | L | a |
|---|---|---|
| Invention | 50.12 | 15.65 |
| As-Is | 49.46 | 14.89 |
| Sol. Ext. | 50.09 | 15.24 |
| Control | 50.25 | 14.57 |

This example shows that the tar-depleted liquid smoke of this invention imparts color to a food product which is substantially equivalent to that imparted by as-is liquid smoke and tar-depleted liquid smoke made from an as-is liquid smoke by a solvent extraction process.

EXAMPLE III

The purpose of this example is to compare the chemical characteristics of the tar-depleted liquid smoke produced in accordance with this invention with those of liquid smokes produced by other methods.

Using the apparatus and method described in Example I, two test runs were made. In a run according to the invention, the absorption vessel 74 contained 700 grams of methylene dichloride and 100 grams of water. In a comparative run, the absorption vessel 74 contained 700 grams of water and no methylene dichloride was used. Smoke generation was conducted in each test for about 3.5 hours.

For the run according to the invention (Invent.), the methylene dichloride layer absorbed the tar components of the smoke vapor and the water layer absorbed the color, flavor and odor constituents of the vapor. The temperature of the two liquid layers in the absorptions vessel 74 was about 40° C. The aqueous layer was separated from the methylene dichloride layer by decantation and the resulting tar-depleted liquid smoke (220 grams) was analyzed.

In the comparative control run, the smoke vapors produced during the smoke generation process were only absorbed by the water, resulting in an aqueous mixture of tarry hydrocarbon constituents and smoke color, flavor and odor constituents. The temperature of the aqueous layer was about 100° C. The tarry constituents settled out and the aqueous layer containing the liquid smoke constituents was separated by decantation and then analyzed (Comp. A). Since this liquid smoke was very dilute compared to the tar-depleted liquid smoke produced according to the invention, it was concentrated to a concentration weight ratio of 2.5:1 by evaporating it at a temperature of 50° C. at a pressure of 20 mm Hg. The resulting 220 grams of concentrated liquid smoke was analyzed (Comp. B). The results of the analysis is shown in Table D. Also shown in Table D are values typically found for as-is liquid smoke solutions and the values for the liquid smoke as disclosed in the examples of the above cited U.S. Pat. No. 4,359,481, to Smits, et al. (Smits).

TABLE D

| Sample | CBI | Light Trans. (Percent) | Carb. (mg/g) | Phenols (mg/g) | Acids (%) |
|---|---|---|---|---|---|
| Invent. | 9.8 | 95.9 | 96.3 | 1.5 | 14.9 |
| Comp. A | 6.0 | 98.0 | 72.5 | 5.6 | 5.6 |
| Comp. B | 7.3 | 97.5 | 103.3 | 8.0 | 9.6 |
| Smits | — | — | 25–81 | 1.6–2.3 | 2–6.4 |
| As-Is | 10.5–12 | 0 | 70–100 | 13–20 | 11.5–12.5 |

The data of Table D demonstrates the advantages of the tar-depleted liquid smoke solutions of the invention as compared to other liquid smoke solutions.

The liquid smoke solutions made by the prior art process, wherein smoke vapor is absorbed into an aqueous medium, (Comp. A, Comp. B, and As-Is) all show a significantly higher content of phenols than the liquid smoke of the invention. This low content of phenols in the invention was achieved in addition to the achievement of a favorably high content of the carbonyls. The high content of the carbonyls in relation to the content of the phenols also compares favorably with the liquid smoke concentrates disclosed in Smits, et al. The percent of the phenols in the composition of the invention was only 1.6 percent of the content of the carbonyls (1.5 mg/g phenols/96.3 mg/g carbonyls). This is equivalent to a ratio of carbonyls to phenols of 65:1 on a 2-butanone/DMP basis which is 84:1 on an acetone/phenol basis. This shows significant improvement over the compositions disclosed in Smits, et al. which have a carbonyl to phenol ratio of (17–47):1 on an acetone/phenol basis. This example demonstrates that a desirable high content of the carbonyl coloring constituents can be achieved without necessarily resulting in a corresponding undesirable high content of the phenolic flavoring constituents.

Increased coloring ability does not necessarily correspond to increased flavoring ability. However, the process of the invention produces a liquid smoke solution highly effective for its coloring capability, and although it has a low phenolic content, its flavoring ability is sufficient for commercial applications.

Typically, liquid smoke solutions produced commercially by the prior art process of absorbing smoke vapors into an aqueous medium, and which have a carbonyl content comparable to Comp. A and Comp. B, have a very low light transmittance. This is shown by comparable commercially available as-is liquid smoke solutions which have a light transmittance of 0%. The samples Comp. A and Comp. B would normally be expected to also have a very low light transmittance. However, due to a limitation of the cooling capacity of the condenser, the prior art process of Comp. A and Comp. B was run at a higher than normal temperature of 100° C. In processes of this kind an absorption temperature between about 20° C. and about 45° C. is normally desired. The higher temperature of this example caused a higher proportion of organic acids to be lost by evaporation, as shown by the lower then expected acid content of Comp. A and Comp. B. The acids in a liquid smoke solution solubilize the tars in the liquid smoke solution. In Comp. A the acid content was insufficient to solubilize the tars, and the main portion of the tars fell out of solution before analysis of Comp. A. Thirty grams of solid precipitated tars were removed before the the analysis of Sample Comp. A and the subsequent concentration of Sample Comp. A to form Sample Comp. B.

As was shown above, the tar-depleted liquid smoke produced in accordance with the present invention had coloring ability, as shown by the CBI, comparable to that of commercially available as-is liquid smoke.

EXAMPLE IV

In this example, a nonfibrous casing having a flat width of about 30.0 mm to about 31.8 mm was dipped in the liquid smoke solutions of Example III for 30 seconds. About 10 milligrams of liquid smoke was absorbed per square inch of casing surface (1.55 milligrams per square centimeter). The treated casing was dried and stuffed by conventional methods with an egg albumin emulsion and cooked for 2 hours at 100° C. in a laboratory oven. The egg albumin emulsion contained about 35 wt.% powdered egg white albunin (Kraft, Inc.), about 12 wt.% of a commercial powdered cellulose (Solfaflock, Brown Co.), and about 53 wt.% water. The consistency was that of a thick paste, similar to typical meat emulsions. The color transferred to the egg albumin emulsion is a measure of the coloring ability of the liquid smoke solution for protein substances. Upon visual inspection of the final product, very good smoke color was exhibited by the products processed in the casings treated with the liquid smoke of the invention (Invent.) and the concentrated liquid smoke solution made by a prior art process (Comp. B). The sample made by the prior art process (Comp. A) exhibited only slight smoke color when compared with the white control sample.

EXAMPLE V

Figure 6:
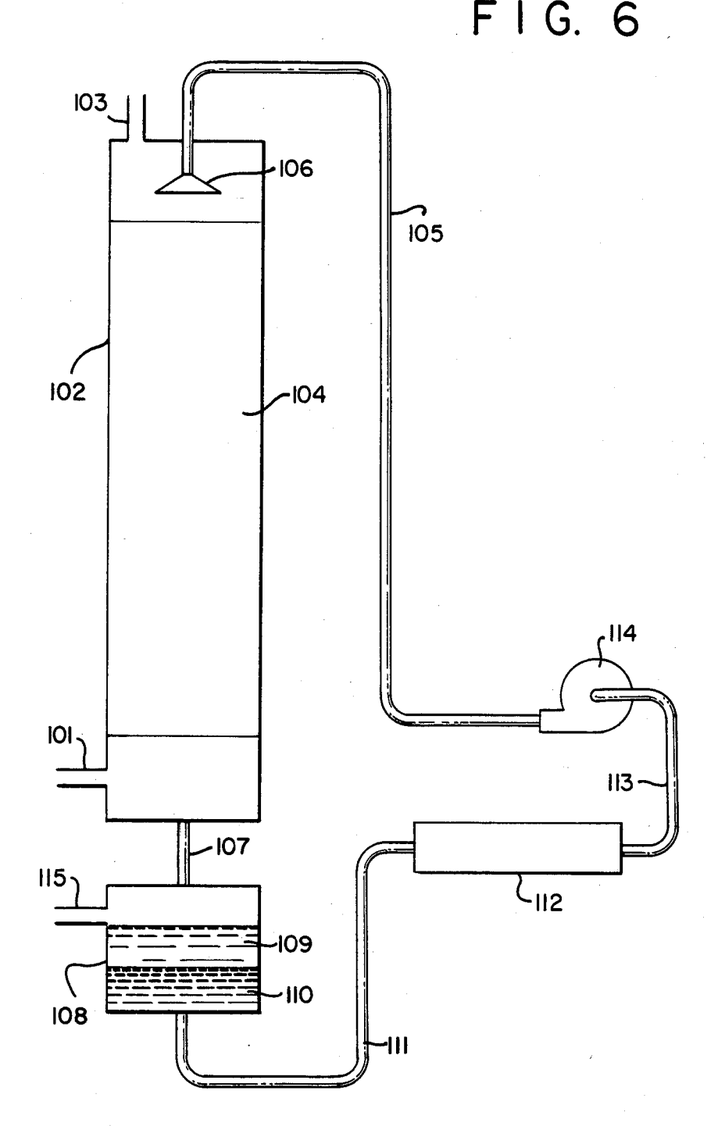
FIG. 6 is a schematic view of the apparatus used in Example 5 for making tar-depleted liquid smoke.

This example demonstrates an embodiment of the invention using a pilot scale process. The apparatus used is illustrated in FIG. 6. Sawdust was fed into a conventional smoke generator (not shown), essentially the same as that as described in U.S. Pat. No. 3,106,473. The generated smoke was conducted through a duct 101 into the bottom of a counter-current absorption unit 102, and was then drawn with a blower (not shown) upwardly and out of the absorption unit 102 through duct 103. The absorption unit 102 was a column about 1 meter high and 15 centimeters in diameter and it contained a bed 104 of packed berl saddles. Methylene chloride was introduced into the top of the absorption unit 102 through conduit 105, and then through a spray nozzle 106, after which it flowed downward and counter-current to the upward flow of the smoke passing through the absorption unit 102. While the smoke vapor was flowing upwardly through the absorption unit, water in the smoke vapor condensed from the smoke vapors and also flowed downwardly through the absorption unit 102, countercurrent to The smoke vapor, thereby absorbing color, flavor, and odor constituents from the smoke vapor as it progressed. The methylene chloride, also flowing countercurrently to the smoke vapors, extracted tars from the smoke vapors and tars which may have been absorbed in the condensed water. The condensed water and the liquid methylene chloride then passed, as separate phases, out of the column through conduit 107. From conduit 107 the two phase liquid passed into a separator 108 in which the liquid separated into a less dense phase 109 comprising an aqueous liquid smoke, containing mainly smoke color, flavor and odor constituents, and a denser phase 110 of methylene chloride, containing mainly smoke tars. The methylene chloride passed from the separator 108 through conduit 111 to a color 112, and recycled via conduits 113, 105 and pump 114 into the absorption unit 102. Lines 111, 113, 105 were insulated stainless steel pipe. The aqueous liquid smoke 109 left the separator 108 by way of an overflow 115 and collected as a tar-depleted liquid smoke product of the invention.

Twenty-four pounds (10.9 kg) of maple sawdust were continuously fed to the smoke generator with the screw fed during the test. The temperature of the smoke vapor entering the absorption unit through duct 101 was about 250° F. (120° C.) at the beginning of the test and rose to about 375° F. (190° C.) at the end of the test. About 65 pounds (29.5 kg) of dry ice were used in the cooler 112, to maintain the temperature of the methylene chloride at between about 30° F. (−1° C.) and about 44° F. (7° C.) as it entered the absorption unit from line 105. Initially there were 16 liters of methylene chloride in the system. During the run, methylene chloride was periodically added to make up for methylene chloride vapors lost to the atmosphere through duct 103. A total of 24 liters of methylene chloride were used with 9.4 liters recovered at the end of the run. The remaining 14.6 liters were lost as vapors through duct 103. The total amount of aqueous tar-depleted liquid smoke condensate obtained through overflow 115 was 2830 ml.

The test was begun by first starting pump 114 and equillibrating the temperature of the methylene chloride to about 33° F. (1° C.). The smoke vapors were then admitted through duct 101 into the adsorption unit 102. Methylene chloride was added in 2 liter increments 45 minutes. 70 minutes, 100 minutes and 110 minutes after the smoke vapors were admitted. Samples of the overflow of the aqueous tar depleted liquid smoke product of 400 ml, 900 ml, and 250 ml were taken 45 minutes, 90 minutes and 125 minutes, respectively, after the smoke vapors were admitted. The samples were combined into one sample (Inv.) and analyzed. Part of the combined sample was concentrated (Conc.) to a weight ratio of 2:1 by evaporation at a temperature of 50° C. and at a pressure of 20 mm Hg, and the concentrated product was then analyzed. The results of the analysis are shown in Table E. The values not shown for the concentrated sample were not measured.

TABLE E

|  | Inv. | Conc. |
|---|---|---|
| Light Trans. (%) | ~60 | — |
| Carbonyls (mg/g) | 152 | 180 |
| Phenols (mg/g) | 5 | 21.7 |
| Acids (wt. %) | 9 | — |
| CBI | 20 | 46.5 |

The above tar-depleted liquid smoke products (Inv. and Conc.) were applied to a casing and the casing was stuffed as in Example II. The "L" and "a" values were measured for the food product stuffed in each casing as well as the "L" and "a" values for a food product stuffed in a control casing that was not treated with liquid smoke. The results of the measurements are shown in Table F.

TABLE F

|  | L | a |
|---|---|---|
| Inv. | 51.8 | 16.3 |
| Conc. | 46.6 | 18.9 |
| Cont. | 55.5 | 17.0 |

This example shows how tar-depleted liquid smoke of the invention having good coloring ability can be produced in a continuous process. Also shown the absence of tars in the tar-depleted liquid smoke as shown by the light transmittance values.

What is claimed is:

1. A method for preparing a tar-depleted smoke colored and smoke flavored tubular casing which comprises (1) thermally decomposing wood in a oxygen-controlled atmosphere to generate smoke-vapors, (2) selectively solvent extracting the tars from the generated smoke vapors with a water immiscible organic solvent, (3) absorbing the tar-extracted smoke vapors into an aqueous medium to provide a tar-depleted liquid smoke solution, and (4) contacting a tubular casing wall with the tar-depleted liquid smoke solution.

2. The method of claim 1 wherein the tar-depleted liquid smoke solution is neutralized to a pH greater than about 3.

3. The method of claim 1 wherein the tar-depleted liquid smoke solution is neutralized to a pH of between about 3 and about 3.5.

4. The method of claim 1 wherein the tar-depleted liquid smoke solution is neutralized to a pH of between about 3 and about 5.

5. The method of claim 1 wherein the tar-depleted liquid smoke solution has a light transmittance greater than about 50 percent.

6. The method of claim 1 wherein the tar-depleted liquid smoke solution has a light transmittance greater than about 80%.

7. The method of claim 1 wherein the tar-depleted liquid smoke solution has a light transmittance greater than about 90%.

8. The method of claim 1 wherein the tar-depleted liquid smoke solution has a light transmittance of about 96%.

9. The method of claim 1 wherein the tar-depleted liquid smoke solution has a phenol content less than about 10 percent of the carbonyl content.

10. The method of claim 1 wherein the tar-depleted liquid smoke solution has a phenol content of less than 2 percent of the carbonyl content.

11. The method of claim 1 wherein the tar-depleted liquid smoke solution has a phenol content of about 1.5 percent of the carbonyl content.

12. The method of claim 1 wherein the tar-depleted liquid smoke solution is further concentrated.

13. The method of claim 12 wherein the tar-depleted liquid smoke is neutralized to a pH greater than about 3.

14. A method for preparing a tar-depleted smoke colored and smoke flavored tubular casing which comprises (1) thermally decomposing wood in an oxygen-controlled atmosphere to generate smoke-vapors, (2) contacting the smoke vapors, water, and an organic solvent immiscible in water and having a solubility parameter greater than about 2.7, to form a tar-containing liquid solvent phase and an aqueous liquid smoke phase, (3) separating the liquid smoke phase from the liquid solvent phase to provide a tar-depleted liquid smoke solution, and (4) contacting a tubular casing wall with the tar-depleted liquid smoke solution.

15. The method of claim 14 wherein the smoke vapors are contacted with water and a solvent in a single contacting zone.

16. The method of claim 14 wherein the smoke vapors are contacted with a solvent in a first contacting zone and thereafter contacted with water in a second contacting zone.

17. The method of claim 14 wherein the temperature of the organic solvent phase in step (2) is about 40° C.

18. The method of claim 14 wherein the tar-depleted liquid smoke solution is further concentrated.

19. The method of claim 14 wherein the tar-depleted liquid smoke is neutralized to a pH greater than about 3.

* * * * *

UNITED STATES PATENT AND TRADEMARK OFFICE
CERTIFICATE OF CORRECTION

PATENT NO. : 4,594,251

DATED : June 10, 1986

INVENTOR(S) : Myron Donald Nicholson

It is certified that error appears in the above-identified patent and that said Letters Patent is hereby corrected as shown below:

Claim 3, line 3, change 3.5 to 6.5.

Col. 6, line 29, change --separatig-- to --separating--.

Col. 9, line 22, --intralox-- should be --intalox--.

Col. 10, line 25, --and monohexyl-- should be --the monohexyl

Col. 14, line 45, --from the-- should be --from that--.

Col. 19, line 56, (Equasion) --DP-- should be --DF--.

Col. 20, line 16, --liqid-- should be --liquid--.

Col. 21, line 56, --wth-- should be --with--.

Col. 21, line 60, --liqid-- should be --liquid--.

Col. 22, line 24, No.--417,713-- should be --417,173--.

Signed and Sealed this

Thirtieth Day of August, 1988

Attest:

DONALD J. QUIGG

Attesting Officer

Commissioner of Patents and Trademarks